Sept. 20, 1949. M. D. WELSH 2,482,230
CHASSIS FOR BABY BUGGIES
Filed March 28, 1946 2 Sheets-Sheet 1

INVENTOR
MATILDA D. WELSH
By John H. Cassidy
ATTORNEY

Sept. 20, 1949. M. D. WELSH 2,482,230
CHASSIS FOR BABY BUGGIES
Filed March 28, 1946 2 Sheets-Sheet 2

INVENTOR
MATILDA D. WELSH
BY John H. Cassidy
ATTORNEY

Patented Sept. 20, 1949

2,482,230

UNITED STATES PATENT OFFICE 2,482,230

CHASSIS FOR BABY BUGGIES

Matilda D. Welsh, Ladue, Mo.

Application March 28, 1946, Serial No. 657,853

6 Claims. (Cl. 280—36)

This invention relates to a chassis for baby carriages and particularly to front axle construction thereof.

The object of the invention is to provide a front axle construction in a chassis for baby carriages so arranged that the carriage will be in a sense self-steering, or in which the axle will shift in response to a directional push on the handle bars of the carriage.

A further object of the invention is to provide a front axle construction, having the characteristic described, which is simple in construction, economical to manufacture and durable in service.

While the invention is described in the appended claims, a detailed description of a preferred embodiment illustrated in the accompanying drawings will assist in understanding and practicing the invention.

Fig. 4 is a detail on line 4—4, Fig. 2;

Fig. 5 is a detail on line 5—5, Fig. 2; and

Fig. 6 is a detail on line 6—6, Fig. 2.

Figure 1:
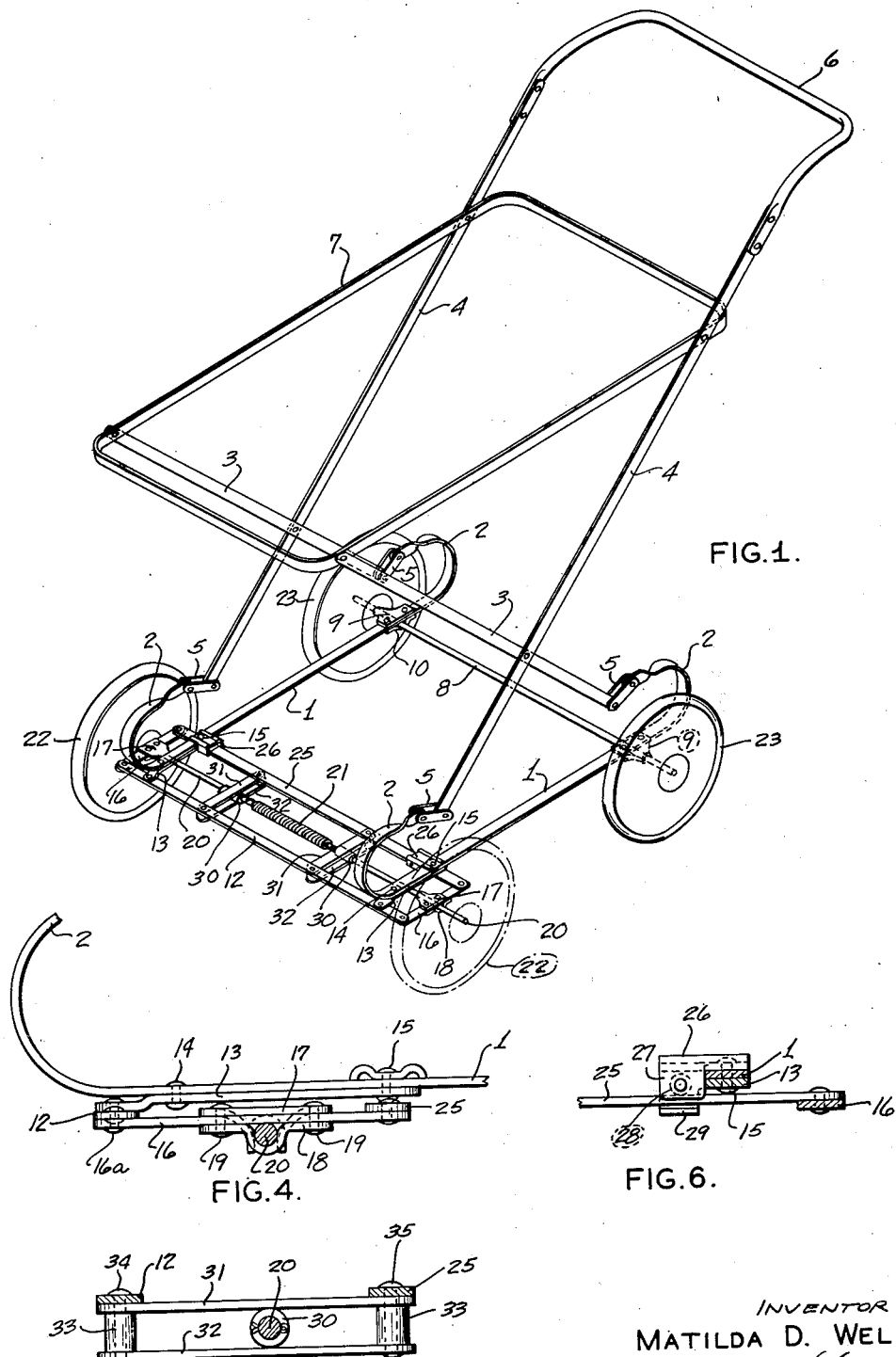
Fig. 1 is a perspective view of a chassis or frame embodying the invention.

Aside from the front portion of the frame or the parts associated with the front axles, the embodiment specifically illustrated and described is of conventional construction. The frame includes a pair of side members 1 which have their ends 2 curved upwardly to form leaf springs. The superstructure includes a pair each of scissor bars 3 and 4 with their lower ends secured by links 5 to the end of the leaf springs 2. A handle bar 6 is attached to the upper ends of the bars 4 and a body supporting frame member 7 is secured to the upper portions of the bars 3 and 4. It may be understood that the bars 4 may be broken by a toggle joint in a manner well understood in the art to provide for collapsing the frame but with such a feature this invention is not concerned.

A rear axle 8 is rigidly secured near the rear ends of the bars of the side frame members 1 by a pair of clips 9 and 10 on each of the members 1. In such an arrangement the rear axle 8 forms a part of the frame.

A front bar 12 is secured to the front ends of the frame members 1 by being rigidly attached to extension bars 13, which are fastened to the front ends of the bars 1 respectively by rivets 14 and 15. It may now be understood that the bottom of the frame or chassis includes a rigid rectangular structure which includes the side members 1, and rear axle 8 and the front bar 12, the short bars 13 being considered as an extension of and integral with the bars 1.

The front bar 12 has its ends extending outwardly beyond the sides of the side members 1 or short bars 13, and at the ends of the bars 12, axle supporting members 16 are pivoted thereto by pins 16a. The axle supporting members 16 are bars or links, each of which carries an upper clip 17 and a lower clip 18 fastened by rivets 19 which pass through the two clips and the bar 16. The clips 17 and 18 are such that each bar securely holds a short front axle 20.

It may now be understood that the front axles are secured to supporting members respectively which are pivoted by pins 16a at the front of the frame, or on the ends of the front frame members 12, and extend rearwardly therefrom.

Figure 2:
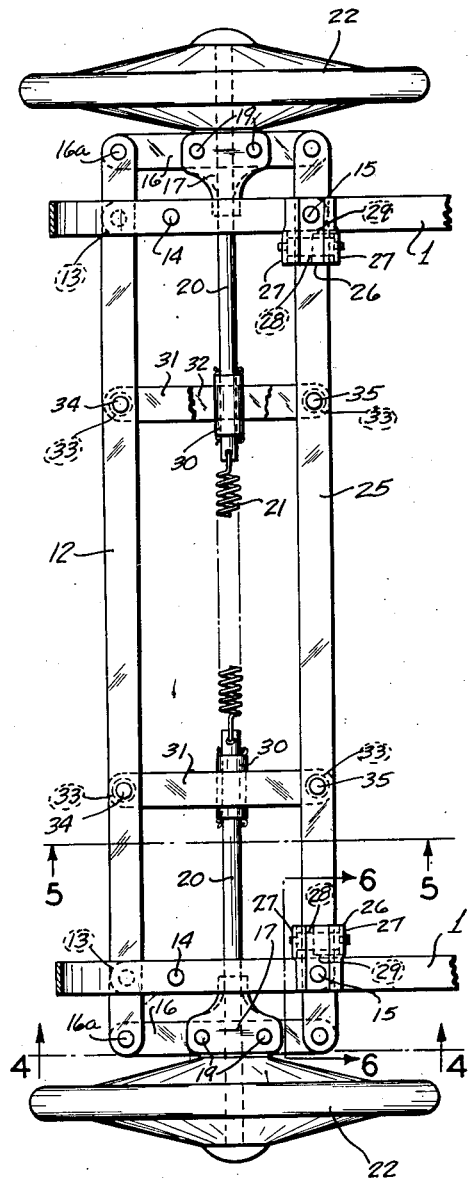
Fig. 2 is a plan view of the front portion of the frame showing the front axles in neutral or straight-ahead position.
Figure 3:
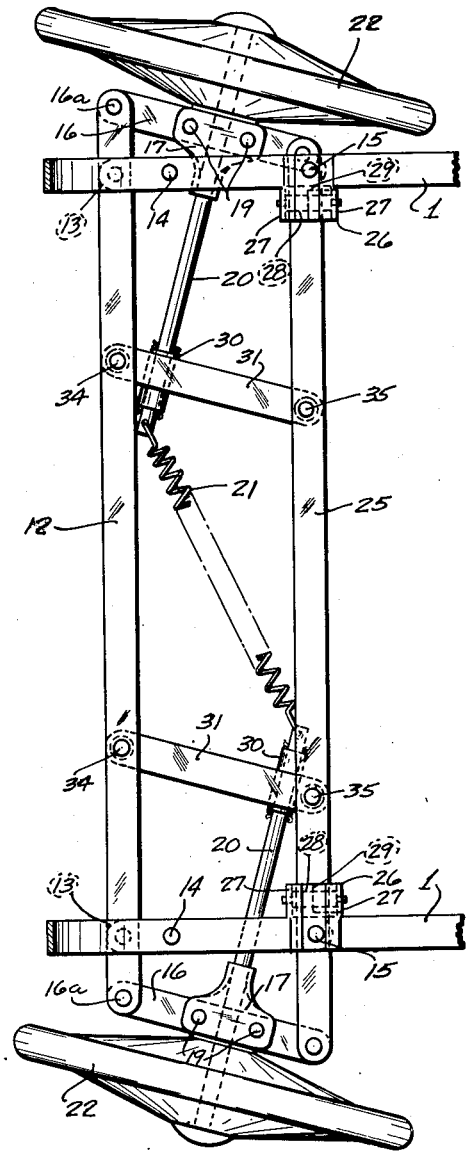
Fig. 3 is a view similar to Fig. 2 with the axle in turning position.

When the axles 20 are in neutral position they are in alignment, and in order to yieldingly hold the axles in this position a coil spring 21 connects the ends of the axles, as is clearly shown in Figs. 1, 2 and 3. When the baby carriage is being pushed and when an appropriate directional urge is given to the handle bars 6 the axles will assume a position shown in Fig. 3 against the pull of the spring 21, but the axles 20 under the influence of the spring 21, will tend to return to and maintain an aligned position for straight-away movement of the carriage.

It will be understood from the drawings, of course, that front wheels 22 are journalled on the outer ends of the front axles 20 respectively, and that rear wheels 23 will be journalled on the outer ends of the rear axles 8.

The rear ends of the axle supporting members 16 are pivotally connected to the ends of a bar or long link 25, the arrangement being such that the bar 25 is parallel to the front frame member or bar 12.

A guide member for the bar or link 25 is secured to each of the frame members 1 and includes a fitting 26 which is best shown in Fig. 6. The fitting 26 has a stem portion by which it is fastened to the bar by a rivet 15 which passes through the bar 1 and the short bar 13. The fitting 26 has downwardly extending ears 27 on each side thereof in which is journalled a roller 28 bearing against the upper surface of the bar 16. One of the ears 27 is bent inwardly to form a flange 29 engaging the bottom surface of the bar 25.

The fitting 26 is sufficiently wide and has sufficient distance between its downwardly extending ears 27 to accommodate or pass the bar 25 in its different positions shown comparatively in Figs. 2 and 3.

A roller 30 is rotatively mounted on the inner end of each of the axles 20 and a guide for the inner end of each axle at the roller 30 is provided. Each guide comprises a pair of links 31 and 32 pivotally connected at their ends to the front bars 12 and the connecting bar or link 25, the links 31 and 32 being held in superimposed parallel relationship and spaced from each other by collars 33 about the pivot pins 34 and 35. The pin 34 pivotally connects the links 31 and 32 to the bar 12 and the pin 35 pivotally connects the links 31 and 32 to the bar 25. The spaced collars 33 are such as to hold the links 31 and 32 an appropriate distance apart to accommodate the roller 30 therebetween.

In the foregoing description it will be apparent that the invention accomplishes its object. A front axle construction has been provided by which the carriage will be guided automatically, in a sense, or responsive to a proper urge on the handle bars of the carriage. The construction is simple and economical to manufacture and is rugged and durable in service.

Various changes may be made within the scope of the appended claims without departing from the spirit of the invention; parts of the invention may be used without the whole and improvements may be added thereto while retaining the benefit of the invention.

I claim:

1. In a chassis for baby carriage, the combination comprising a frame, a pair of front axle supporting members pivoted at the front of the frame and extending rearwardly therefrom, a front axle secured to each of said supporting members rearwardly of said pivotal connection, a cross bar pivotally connected to the rear ends of said axle supporting members, and a spring between the inner ends of said axles for urging said axles in alignment one with the other.

2. In a chassis for baby carriage, the combination comprising a frame, a pair of front axle supporting members pivoted at the front of the frame and extending rearwardly thererom, a front axle secured to each of said supporting members rearwardly of said pivotal connection, and a spring connected between the inner ends of said axles for urging said axles in alignment one with the other.

3. In a chassis for baby carriage, the combination comprising a frame, a pair of front axle supporting members pivoted at the front of the frame and extending rearwardly therefrom, a front axle secured to each of said supporting members rearwardly of said pivotal connection, a guide for the inner end of each axle comprising a pair of longitudinal bars secured to the frame and spaced one above the other to provide a space therebetween for the axle, and resilient means for urging said axles in alignment one with the other.

4. In a chassis for baby carriage, the combination comprising a frame, a pair of front axle supporting members pivoted at the front of the frame and extending rearwardly therefrom, a front axle secured to each of said supporting members rearwardly of said pivotal connection, a roller on the inner end of each of said axles, a guide for each of said rollers comprising a pair of longitudinal bars secured to the frame and spaced one above the other to provide a space therebetween for the axle, and resilient means for urging said axles in alignment with one another.

5. In a chassis for baby carriage, the combination comprising a frame, a pair of front axle supporting members pivoted at the front of the frame and extending rearwardly therefrom, a front axle secured to each of said supporting members rearwardly of said pivotal connection, a link connecting the rear ends of said axle supporting members, a roller on the inner end of each of said axles, a guide for each of said rollers comprising a pair of longitudinal bars with their front ends pivotally secured to the frame and their rear ends pivotally secured to said link spaced one above the other to provide a space therebetween for the roller, and a spring connected between the inner ends of said axle for urging said axle in alignment with each other.

6. In a chassis for baby carriage, the combination comprising a frame having a front cross bar, a pair of front axle supporting members pivotally secured to the ends of said cross bar and extending rearwardly therefrom, a front axle secured to each of said supports, rearwardly of said pivotal connection, a link pivotally connected to the rear ends of said axle supporting members, a guide for the inner ends of the axles comprising a pair of bars pivotally secured at their front ends to said cross bar and at their rear ends to said link and spaced one above the other to provide a space therebetween for said axles, a pair of guides on each side of the frame for said link, and resilient means for urging said axles in alignment one with the other.

MATILDA D. WELSH.

REFERENCES CITED

The following references are of record in the file of this patent:

UNITED STATES PATENTS

| Number | Name | Date |
| --- | --- | --- |
| 810,679 | Rudert | Jan. 23, 1906 |
| 1,100,713 | Colson | June 23, 1914 |